United States Patent [19]

Yamamoto et al.

[11] Patent Number: 5,005,163

[45] Date of Patent: Apr. 2, 1991

[54] LEVEL SHIFT CIRCUIT OF OPTICAL DISC APPARATUS

[75] Inventors: Makoto Yamamoto; Akio Terada, both of Kodaira, Japan

[73] Assignee: Nakamichi Corp., Tokyo, Japan

[21] Appl. No.: 523,199

[22] Filed: May 16, 1990

Related U.S. Application Data

[63] Continuation of Ser. No. 302,125, Jan. 26, 1989, abandoned, which is a continuation of Ser. No. 39,260, Apr. 17, 1987, abandoned.

[30] Foreign Application Priority Data

Apr. 18, 1986 [JP]  Japan ................................ 61-57421

[51] Int. Cl.[5] .............................................. G11B 7/095
[52] U.S. Cl. ................................. 369/44.36; 369/54; 369/58
[58] Field of Search ................. 369/43, 53, 54, 58, 369/106, 124, 44.29, 44.31–44.33, 44.35, 44.36; 360/77.01–77.03, 77.06; 250/201.1, 201.5

[56] References Cited

U.S. PATENT DOCUMENTS

| | | | |
|---|---|---|---|
| 3,593,333 | 7/1971 | Oswald | 360/77 |
| 3,691,543 | 9/1972 | Mueller | 360/77 |
| 3,818,502 | 6/1974 | Chien et al. | 360/77 |
| 4,190,859 | 2/1980 | Kinjo | 369/44 |
| 4,268,745 | 5/1981 | Okano | 369/44 |
| 4,475,182 | 10/1984 | Hosaka | 369/46 X |
| 4,541,084 | 9/1985 | Oku et al. | 369/45 |
| 4,587,644 | 5/1986 | Fujiie | 369/46 X |
| 4,611,317 | 9/1986 | Takeuchi et al. | 369/45 |
| 4,691,308 | 9/1987 | Takagi et al. | 369/46 X |
| 4,700,334 | 10/1987 | Shinkai | 369/46 X |

Primary Examiner—Aristoelis M. Psitos
Assistant Examiner—W. R. Young
Attorney, Agent, or Firm—Sughrue, Mion, Zinn, Macpeak & Seas

[57] ABSTRACT

A circuit for shifting the level of a signal inputted in the focussing or tracking servocircuit provided with an automatic gain control device in an optical disc apparatus. The circuit comprises a plurality of variable gain amplifiers arranged at a stage prior to detecting a focussing or tracking error and forming the corresponding error signal, inclusive of gain set apparatus for selecting one of a plurality of gains of said gain amplifiers depending on the detected level range of the light quantity reflected from the optical disc.

3 Claims, 2 Drawing Sheets

LEVEL SHIFT CIRCUIT OF OPTICAL DISC APPARATUS

This is a continuation of application Ser. No. 302,125 filed on Jan. 26, 1989, which was a continuation of application Ser. No. 039,260 filed Apr. 17, 1987, both now abandoned.

BACKGROUND OF THE INVENTION

The invention relates to a level shifting circuit for maintaining the level of signal to be inputted in the servocircuit in the optical disc apparatus within a given range.

The servocircuit for making tracking and focussing control in an optical disc apparatus may have an automatic gain control device in order to prevent the operation stability from being jeopardized and to prevent the tracking and focussing control from causing errors due to level fluctuation of signals taken out of a photosensor. The automatic gain control device which will be called an "AGC device" hereinafter comprises a divider for forming a reciprocal of the light quantity signal level and a multiplier for multiplying the reciprocal with an error signal in the servocircuit.

The AGC device may be appreciable, but there is inevitably a limitation on the input level of the AGC device itself due to the divider used therein. Although the divider may form the reciprocal, the output thereof can not be raised endlessly when the level of input signal is lowered. An amplifier used for the divider will become saturated. Furthermore, since the divider inevitably has an offset in view of the structure thereof the influence of the offset on the output to appear when the level of input signal is lowered cannot be ignored. For the reasons referred to above, normal operation cannot be assured and the range of input signal level necessary for normal operation cannot be so expanded even if the AGC device is provided, in a case where the input signal level to the servocircuit is low.

SUMMARY OF THE INVENTION

It is an object of the invention to provide a level shifting circuit in an optical disc apparatus capable of always stably operating the AGC device in the servocircuit relative to a large range of varied incident light quantity level by compensating fluctuation of incident light quantity caused from fluctuation of disc reflectivity, laser output and the like.

It is a further object to provide such level shifting circuit capable of indicating that the stable operation cannot be expected when the incident light quantity level is deviated from the range.

In order to attain these objects the circuit according to the invention is arranged as follows. There are provided a plurality of variable gain amplifiers in front of means for detecting focussing and tracking errors in the optical disc apparatus and a gain set circuit adapted to select one among a plurality of gains of the amplifiers depending on the level range of the reflexed light quantity from the optical disc.

It is desirable to design the gain set circuit to generate an output signal to indicate that the incident light quantity level is not suitable for processing when the level of the reflexed light quantity is out of the range.

According to the invention, the level of the light quantity signal is controlled prior to entering the AGC device of the servocircuit. In the variable gain amplifiers to achieve level control, exchange of the gain is made depending on the level of the light quantity signal outputted from the photosensor. The detection of the light quantity signal level and exchange of the gain are carried out by the gain set circuit. The gain set circuit is adapted to indicate that necessary and relevant control cannot be done in a case where said light quantity signal level is out of the range.

The invention will be explained in more detail as to a preferred embodiment in reference to the accompanying drawings.

DESCRIPTION OF THE PREFERRED EMBODIMENT

Figure 1:
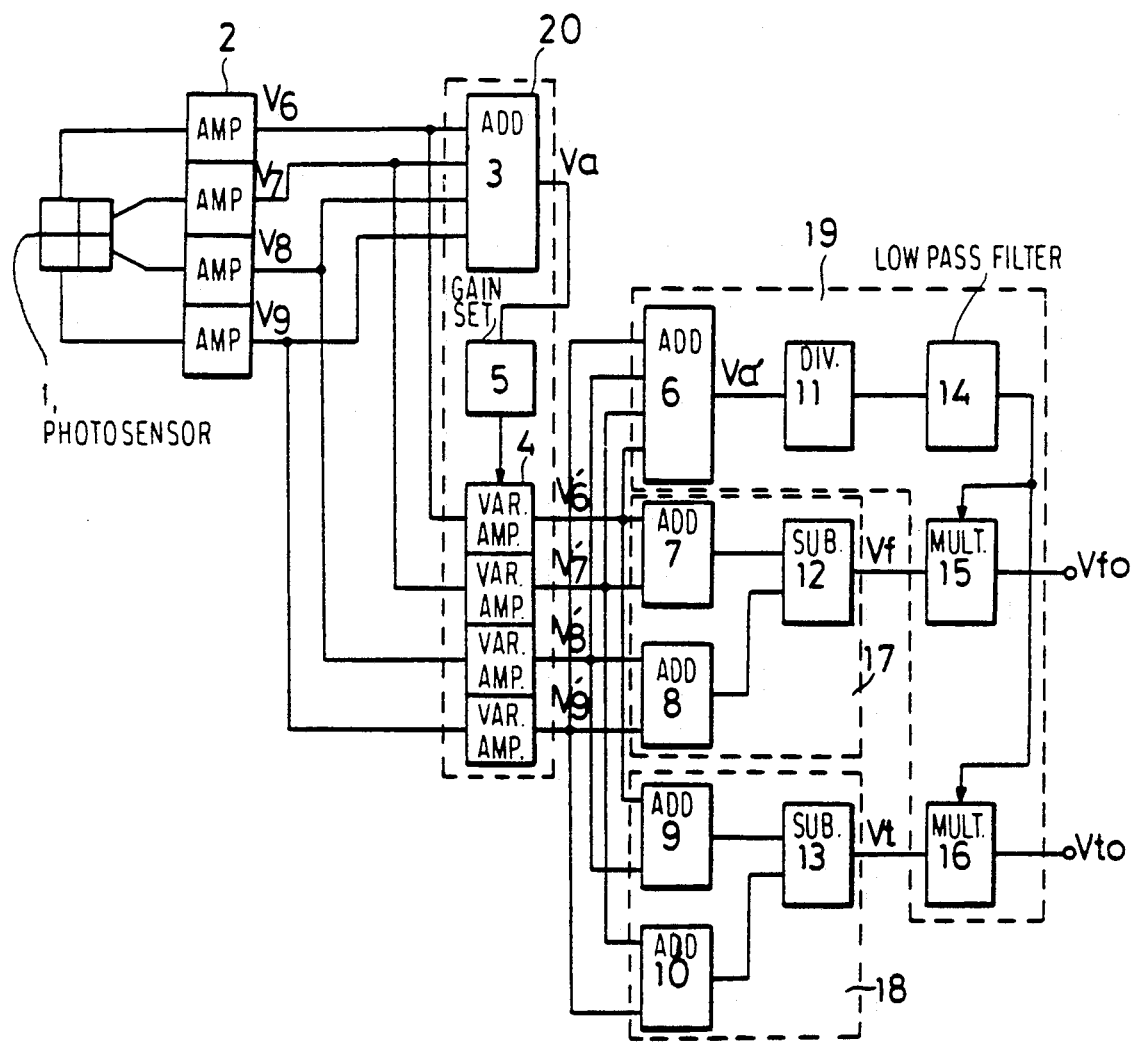
FIG. 1 is a block diagram showing a portion of the optical disc apparatus provided with the level shift circuit according to the invention.

In FIG. 1, there is arranged a tetramerous photosensor 1 in optical pick-up to receive light reflexed from the optical disc (not shown) to output four electrical signals. These photoelectrically converted light quantity level signals are respectively amplified by four amplifiers 2 each having low-pass filter for removing record information component to be supplied to an adder 3 as photoelectric signals V6–V9 and to a servocircuit via four variable gain amplifiers 4 to be used for focus controlling and tracking there.

The servocircuit comprises a circuit 17 for forming a focus error signal, a circuit 18 for forming a tracking error signal, AGC device (an automatic gain control device) 19 and driving circuits (not shown) for driving the optical pick-up based on error output signals Vfo and Vto.

Error signals Vf and Vt which are necessary for focus control and tracking are formed by adding two pairs of said photoelectric signals V6–V9 respectively from four areas of the photosensor 1 and subtracting between the resulting two sums. For that purpose the error signal forming circuits 17 and 18 respectively have two adders 7, 8 and 9, 10 as well as one subtracter 12, 13. In order that the servocircuit may be stably operated, the error signal forming circuits 17, 18 are used in cooperation with the AGC device 19 which comprises an adder 6, a divider 11, a low-pass filter 14 and multipliers 15, 16.

The adder 6 makes a total of photoelectric signals V6′–V9′ inputted into the servocircuit to output the light quantity signal Va′ which is converted into a reciprocal thereof by means of divider 11 arranged at the next. The reciprocal signal is supplied to the low-pass filter 14 in order to remove alternating component. By multiplying the reciprocal respectively to the error signals Vf, Vt, it is possible to obtain error output signals Vfo, Vto which are free from influence by fluctuation of signals V6–V9 caused by incident light quantity fluctuation.

It is noted, however, that since there is naturally a limitation in the input and output level to be treated in the concerned elements in the signal path preceding the divider 11, in case the gain of the variable gain amplifier 4 is made constant, complete elimination of error output signal level fluctuation cannot always be expected. As well known, the divider 11 has a difficulty particularly in treatment of input signals of a fairly low level.

According to the invention, this, there is arranged the level shifting circuit 20, which comprises said adder 3, variable gain amplifiers 4 and gain set circuit 5, at the prior stage to the servocircuit inclusive of the AGC device.

Figure 2:
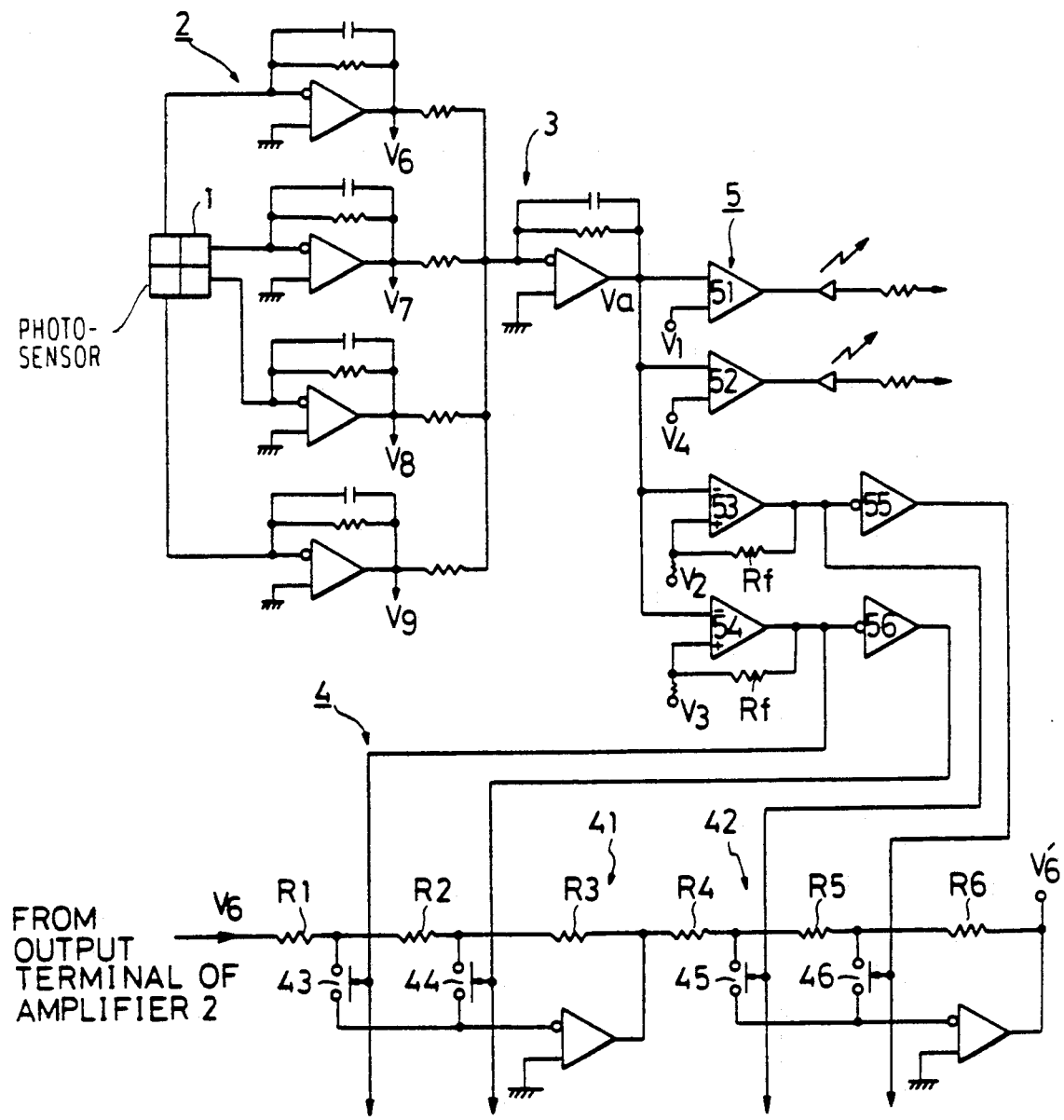
FIG. 2 shows an embodiment of the invention.

Now in reference to FIG. 2, operation of such level shifting circuit 20 will be explained. The outputs of the tetramerous photosensor 1 are respectively amplified by the amplifiers 2 each inclusive of the low-pass filter for removing the record signal component to be fed to the adder 3 of the level shifting circuit, as referred to above. Said outputs of the amplifiers 2 are respectively supplied also to the four variable gain amplifiers 4, only one of which is shown in FIG. 2.

In the illustrated embodiment, the gain set circuit 5 comprises principally four comparators 51, 52, 53, 54. To one of input terminals of the respective comparators, the output signal from the adder circuit 3, i.e. the light quantity signal Va is fed. To the other inputs of the comparators 51, 52, 53 and 54, reference voltages V1, V4, V2 and V3 are respectively applied, among which V1 and V4 respectively correspond to the upper and lower limits of the light quantity signal Va treated by the servocircuit. When the light quantity signal Va is lower than the reference voltage V1 the comparator 51 generates an output to energize the light emission diode arranged at the following state, while in case where the light quantity signal Va is higher than the reference voltage V4, the comparator 52 generates an output to energize the light emission diode respectively to indicate that the levels of the light quantity signal Va are not suitable to be treated.

The reference voltages V2 and V3 are used respectively as threshold levels for exchanging the gain of the variable gain amplifier 4. Each of the comparators 53, 54 has a positive feedback resistor Rf. Effective threshold level is varied every output exchange and consequently comparators 53, 54 are adapted not to be responsive to fluctuation of the light quantity signal Va in the vicinity of the threshold level. The comparators 53, 54 may be formed as Schmitt trigger circuits.

If the voltage V3 is higher than the voltage V2, when the level of the light quantity signal Va is lower than voltage V2, the comparators 53, 54 generate outputs of high level, while inverters 55, 56 arranged at the following stage thereto generate outputs of low level, so that switches 43, 45 are closed and switches 44, 46 are opened in the variable gain amplifier 4.

Each of the four variable gain amplifiers 4 comprises two stages of operational amplifiers 41, 42 in cascade connection. The gains in the amplifiers 41, 42 at each state are represented by the following formulae:

$G41 = (R2+R3)/R1$ $G42 = (R5+R6)/R4$

The both amplifiers 41 and 42 are of high gains and consequently the variable gain amplifier 4 is of high gain.

In case where the level of the light quantity signal Va lies in the range of V2–V3, however, the comparator 53 generates the output of low level but the comparator 54 generates the output of high level, As a result the switch 45 is open but the switch 46 is closed in the amplifier 42 so that the gain thereof is to be low in said state as represented by the following formula:

$G42' = R6/(R4+R5)$

Thus, the variable gain amplifier 4 is a medium gain.

Furthermore, when the level of the light quantity signal Va becomes higher than the reference voltage V3, both the comparators 53 54 generate outputs of lower level so that the switch 43 is open but the switch 44 is closed. At this state, the gain of the amplifier 41 is also made to be low as follows:

$G41' = R3/(R1+R2)$

As a result, the variable gain amplifier 4 is a low gain. Thus, the levels of the light quantity signal V6'–V9' to be applied to the servocircuit are controlled.

If the condition is set as R1:R2:R3 = R4:R5:R6 = 1:2:3, each gain of the operational amplifiers 41, 42 is 1 in the low gain and 5 in the high gain. Accordingly, the gain of the variable gain amplifier 4 is to be of 1, 5 or 25 depending on change of the state.

For instance, if the allowable range of the light quantity signal Va' detected in the servocircuit is of from 1 volt to 10 volts, the allowable range of the light quantity signal Va corresponding to the incident light quantity is 1–10 V in case of the low gain of the variable gain amplifier 4, 0.2–2 V in case of the medium gain and 0.04–0.4 V in case of the high gain to allow the range of 0.04–10 V as a whole owing to the operation of the gain set circuit 5.

Thus, owing to the level shifting circuit the allowable range may be expanded 25 times and it is possible to ensure stable operation of the AGC device in the servocircuit despite fluctuations of wide range of the incident light quantity caused by fluctuations of the disc reflectivity, laser output and the like.

While a preferred embodiment of the invention has been illustrated and described with reference to the accompanying drawings, it will be understood by those skilled in the art that they are by way of example, and that various changes and modifications may be made without departing from the spirit and scope of the invention, which is intended to be defined only to the appended claims.

What is claimed is:

1. An optical disc apparatus, comprising:
   a servo circuit including an automatic gain control device having a predetermined range of permissible input signal levels, and
   a shifting circuit for shifting the level of signals inputted to said servo circuit, said shifting circuit comprising: photodetecting and converting means for detecting optical signals reflected from the optical disc and for converting the detected optical signals into electrical signals, a plurality of variable gain amplifiers receiving said electrical signals from said photodetecting and converting means aid variable gain amplifiers outputting signals for detecting at least one of a focussing or tracking error and forming a corresponding error signal, respectively, means for determining a level of a quantity of light reflected from the optical disc according to said electrical signals, and gain set means for selecting one of a plurality of gains of said variable gain amplifiers depending on the level determined so that the outputs of said variable gain amplifiers are within the predetermined range of permissible input signal levels of said automatic gain control device.

2. The optical disc apparatus as set forth in claim 1, wherein said gain set means has means for generating an output when said determined level of the quantity of light is out of a previously set range, the output of said generating means indicating that the present quantity of light is not suitable to be treated.

3. The optical disc apparatus as set forth in claim 1, wherein said servo circuit further includes a first circuit, connected to receive the outputs of said plurality of variable gain amplifiers, for outputting a focus error signal, and a second circuit, connected to receive the outputs of said plurality of variable gain amplifiers, for outputting a tracking error signal.

* * * * *